US007783469B2

(12) United States Patent
Francis et al.

(10) Patent No.: US 7,783,469 B2
(45) Date of Patent: Aug. 24, 2010

(54) METHODS AND COMPUTER PROGRAM PRODUCTS FOR BENCHMARKING MULTIPLE COLLABORATIVE SERVICES PROVIDED BY ENTERPRISE SOFTWARE

(75) Inventors: Arthur R. Francis, Raliegh, NC (US);
Scott H. Snyder, Chapel Hill, NC (US);
Stephen T. King, Cary, NC (US); Susan S. Hanis, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 11/620,415

(22) Filed: Jan. 5, 2007

(65) Prior Publication Data

US 2008/0167840 A1 Jul. 10, 2008

(51) Int. Cl.
*G06F 9/45* (2006.01)
*G06F 15/173* (2006.01)

(52) U.S. Cl. .................................. 703/22; 709/223
(58) Field of Classification Search .................. 703/22; 709/223; 717/124, 135; 714/47; 702/182
See application file for complete search history.

(56) References Cited

U.S. PATENT DOCUMENTS

| 5,812,780 | A | * | 9/1998 | Chen et al. ................... 709/224 |
| 6,002,871 | A | * | 12/1999 | Duggan et al. ............... 717/135 |
| 6,324,492 | B1 | * | 11/2001 | Rowe ........................... 703/13 |
| 6,360,332 | B1 | * | 3/2002 | Weinberg et al. .............. 714/4 |
| 6,754,701 | B1 | * | 6/2004 | Kessner ....................... 709/219 |
| 6,772,107 | B1 | * | 8/2004 | La Cascia et al. ............. 703/21 |
| 6,799,213 | B1 | | 9/2004 | Zhao et al. |
| 6,859,758 | B1 | * | 2/2005 | Prabhakaran et al. ........ 702/186 |
| 7,120,676 | B2 | * | 10/2006 | Nelson et al. ................ 709/218 |
| 7,197,559 | B2 | * | 3/2007 | Goldstein et al. ............ 709/224 |
| 7,519,527 | B2 | * | 4/2009 | Lau et al. ...................... 703/21 |
| 7,523,127 | B2 | * | 4/2009 | Chen-Wright et al. ....... 707/102 |
| 7,630,862 | B2 | * | 12/2009 | Glas et al. .................... 702/186 |
| 2003/0036897 | A1 | | 2/2003 | Flores et al. |
| 2005/0095569 | A1 | * | 5/2005 | Franklin ...................... 434/350 |
| 2005/0270982 | A1 | | 12/2005 | McBeath |

* cited by examiner

*Primary Examiner*—Dwin M Craig
(74) *Attorney, Agent, or Firm*—Cantor Colburn LLP; Joseph Bracken

(57) ABSTRACT

A simulated collaborative mix workload for determining the performance of enterprise software includes a combination of mail, instant messaging, electronic meetings, documents, and electronic learning. The workload is generated by executing a team spaces path, documents path, learning path, messaging path, web conference path, or various combinations thereof. The team spaces path generates a simulated discussion with team members and generates a search query for locating a forum within the team space. The documents path generates a library search to locate, open, and read the document, and generates a simulated chat about the document. The learning path launches a simulated course and assessment activity. The messaging path reads a simulated email, attaches a document thereto, and sends the email. The web conference path generates a web conference attended by a plurality of simulated users. At least one of the workload tasks is performed more than once.

10 Claims, 6 Drawing Sheets

METHODS AND COMPUTER PROGRAM PRODUCTS FOR BENCHMARKING MULTIPLE COLLABORATIVE SERVICES PROVIDED BY ENTERPRISE SOFTWARE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention relates generally to workload simulation tools and, more specifically, to methods and computer program products for benchmarking multiple collaborative services provided by enterprise software.

2. Description of Background

Various benchmarking tools exist for determining the performance of enterprise software running on specific hardware platforms. Illustrative examples of such tools include Microsoft Exchange Server Load Simulator 2003 (LoadSim), Exchange and Performance Tool (ESP), and Lotus Notes-Bench. LoadSim tests server response to email loads on servers running Microsoft Exchange 2003. This functionality is accomplished by sending multiple messaging requests to the Exchange server, thereby creating a simple mail load. ESP simulates large numbers of Exchange client sessions by concurrently accessing a plurality of protocol servers. Scripts control the actions each simulated client takes, and test module dynamically linked libraries (DLLs) then execute these scripts. Lotus NotesBench provides simple stimulated mail workloads for servers running Lotus Notes.

Existing tools such as LoadSim, ESP, and Lotus Notes-Bench enable simulation of simple messaging-only testing methodologies, such as the sending and receiving of email messages as well as calendaring and scheduling activities. Although sufficient for validating the performance of a single collaborative function in isolation, such tools do not test the behavior of servers running enterprise software under realistic conditions of collaborative use. For example, a typical business enterprise may use a hardware platform to provide several different collaborative functionalities including email, team collaboration, instant messaging, documents, electronic meetings, and electronic learning. Accordingly, what is needed is a benchmarking tool capable of providing a workload that simulates a combination of mail, instant messaging, electronic meetings, documents, and electronic learning.

SUMMARY OF THE INVENTION

The shortcomings of the prior art are overcome and additional advantages are provided by generating a simulated collaborative mix workload for assessing the performance of enterprise software executed on a hardware platform. The collaborative mix workload includes a combination of mail, instant messaging, electronic meetings, documents, and electronic learning. The workload is generated by executing at least two of a team spaces path, a documents path, a learning path, a messaging path, or a web conference path. The team spaces path generates a simulated discussion with team members and generates a search query for locating a forum within the team space. The documents path generates a library search to locate a document, opens the document, reads the document, and generates a simulated chat about the document. The learning path launches a simulated course and a simulated assessment activity. The messaging path reads a simulated email, attaches a document to the simulated email, and sends the simulated email with the attached document. The web conference path generates a web conference attended by a plurality of simulated users. At least one of the team spaces path, documents path, learning path, or messaging path are performed more than once.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution wherein a collaborative mix workload is simulated for determining the performance of enterprise software executed on a hardware platform under realistic conditions of collaborative use. The collaborative mix workload includes a combination of mail, instant messaging, electronic meetings, documents, and electronic learning.

BRIEF DESCRIPTION OF THE DRAWINGS

The subject matter, which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Like reference numerals are used to refer to like elements throughout the drawings. The detailed description explains the preferred embodiments of the invention, together with advantages and features, by way of example with reference to the drawings.

DETAILED DESCRIPTION OF THE INVENTION

Figure 1:
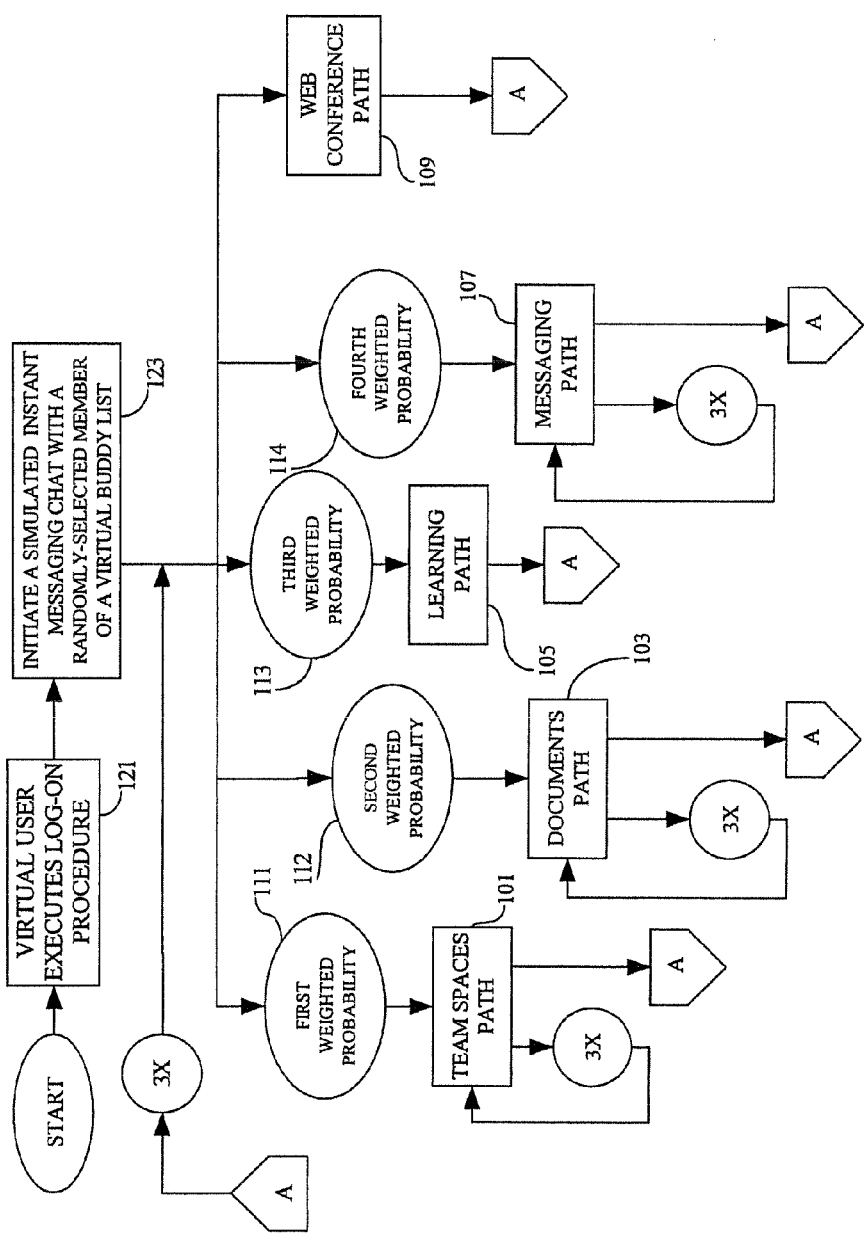
FIG. 1 illustrates an exemplary method for simulating a collaborative mix workload for determining the performance of enterprise software executed on a hardware platform.

FIG. 1 illustrates an exemplary method for simulating a collaborative mix workload for determining the performance of enterprise software executed on a hardware platform. The workload is simulated by modeling user interactions with email, documents, learning, team spaces, instant messaging, and web conference functions. The process commences at block 121 where a virtual user executes a log-on procedure. The user is virtual in the sense that the user is computer simulated. Next, a simulated instant messaging chat is initiated with a randomly-selected member of a virtual (computer-simulated) buddy list (block 123). The simulated instant messaging chat emulates the interactions required to maintain awareness of the instant messaging status of users whose names appear on the returned pages, also referred to as "live name awareness".

Following the simulated chat, some virtual users are randomly selected to proceed along a web conference path 109, to be described in greater detail hereinafter with reference to FIG. 6. The remaining virtual users are randomized with a weighted probability table to proceed along either a team spaces path 101, a documents path 103, a learning path 105, or a messaging path 107. The weighted probability table uses a first weighted probability 111 to select team spaces path 101, a second weighted probability 112 to select documents path 103, a third weighted probability 113 to select learning path 105, and a fourth weighted probability 114 to select messaging path 107. The sum of first, second, third, and fourth weighted probabilities 111, 112, 113, 114 is equal to one (signifying 100%). Illustratively, first weighted probability 111 could be 20%, with second weighted probability 112 set to 30%, third weighted probability 113 set to 7%, and fourth weighted probability 114 set to 43%. Further details concerning team spaces path 101 are discussed in conjunction with FIG. 2. Similarly, further details concerning documents path 103 are discussed in conjunction with FIG. 3, further details concerning learning path 105 are discussed in conjunction with FIG. 4, and further details concerning messaging path 107 are discussed in conjunction with FIG. 5.

The process of following a path such as team spaces path 101, documents path 103, learning path 105, or messaging path 107, is iterative in nature. Following completion of a path, the virtual user may complete this path yet again, or the virtual user may complete another path, wherein the paths to be completed are selected at random in accordance with first, second, third, and fourth weighted probabilities 111, 112, 113, 114. In the example of FIG. 1, team spaces path 101, documents path 103, and messaging path 107 are shown as iterating (i.e., repeating) for three times before another path is randomly selected. However, three iterations are shown solely for illustrative purposes, as any number of zero or more iterations may be provided. After the iterations of an individual path are completed, the process of FIG. 1 is shown as once again selecting a random path for a total of three overall iterations. However, three overall iterations are shown for illustrative purposes only, as any number of one or more overall iterations may be provided.

Figure 2:
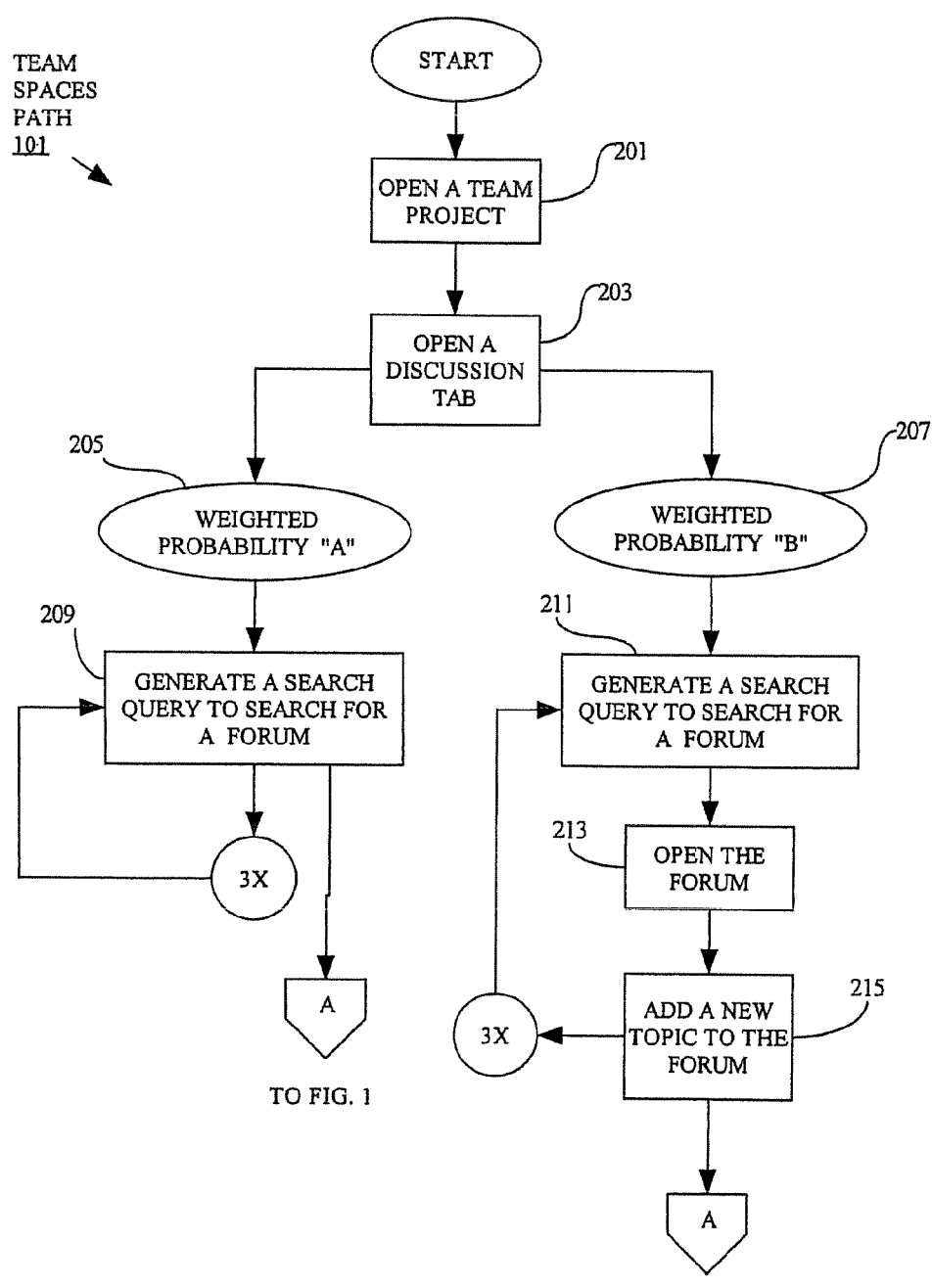
FIG. 2 illustrates an exemplary method for simulating a team space workload for use with the method of FIG. 1.

FIG. 2 illustrates an exemplary method for simulating a team space workload for use with the method of FIG. 1. The method commences at block 201 where a team project is opened. At block 203, a discussion tab is opened. Next, one of two sub-paths are randomly selected based upon weighted probability A 205 and weighted probability B 207, wherein these weighed probabilities sum to one (signifying 100%). Upon random selection of a first path, the process advances to block 209 where a search query is generated to search for a forum. Block 209 is repeated for a total of one or more iterations, wherein the example of FIG. 2 shows three iterations for illustrative purposes. The process then returns to FIG. 1 where first, second, third, and fourth weighted probabilities 111, 112, 113, and 114 (FIG. 1) are applied to select another path.

Upon selection of a second path at blocks 203 and 207 of FIG. 2, a search query is generated to search for a forum (block 211). The forum is opened (block 213), and a new topic is added to the forum (block 215). Blocks 211, 213 and 215 are repeated for one or more iterations, wherein the example of FIG. 2 shows three iterations for illustrative purposes. The process then returns to FIG. 1 where first, second, third, and fourth weighted probabilities 111, 112, 113, and 114 (FIG. 1) are applied to select another path.

Figure 3:
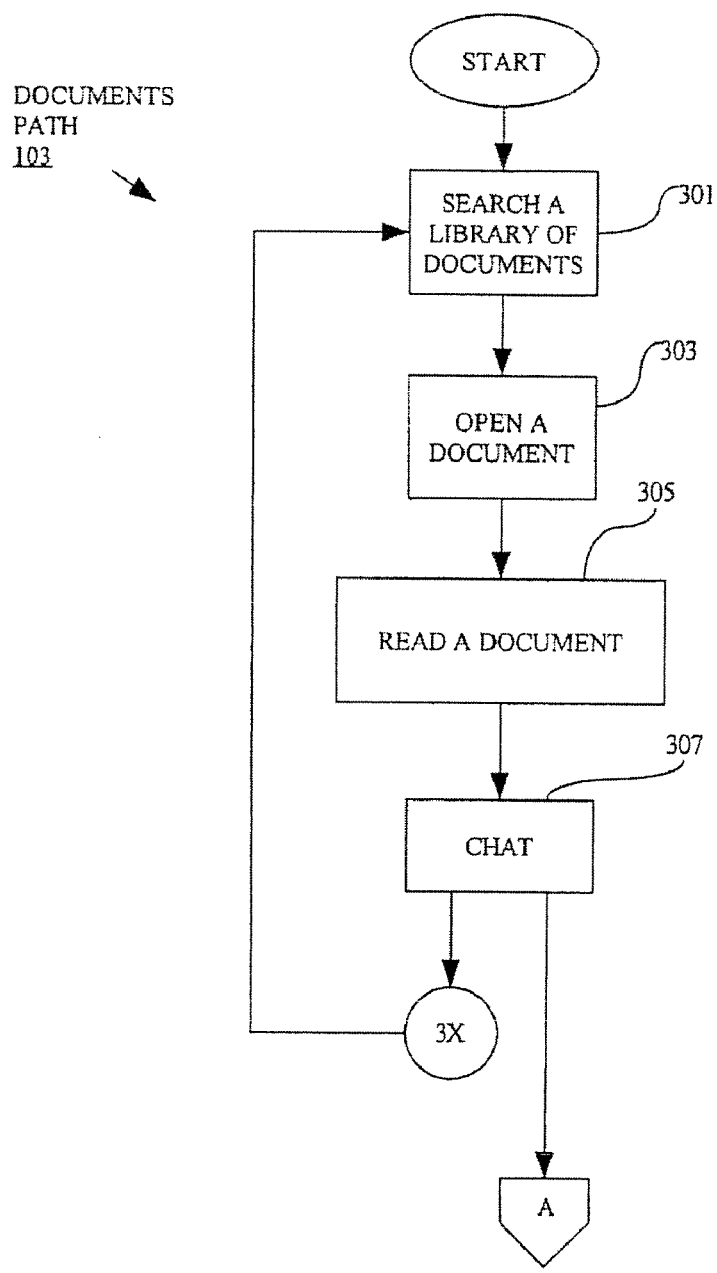
FIG. 3 illustrates an exemplary method for simulating a document workload for use with the method of FIG. 1.

FIG. 3 illustrates an exemplary method for simulating a document workload for use with the method of FIG. 1. The process commences at block 301 where a search is performed on a library of documents to locate a predesignated document. The document is opened (block 303) and read (block 305). A simulated chat about the document is initiated with a randomly selected virtual buddy selected from a virtual buddy list (block 307). Blocks 301, 303, 305, and 307 are repeated for a total of one or more iterations, wherein the example of FIG. 3 shows three iterations for illustrative purposes. The process then returns to FIG. 1 where first, second, third, and fourth weighted probabilities 111, 112, 113, and 114 (FIG. 1) are applied to select another path.

Figure 4:
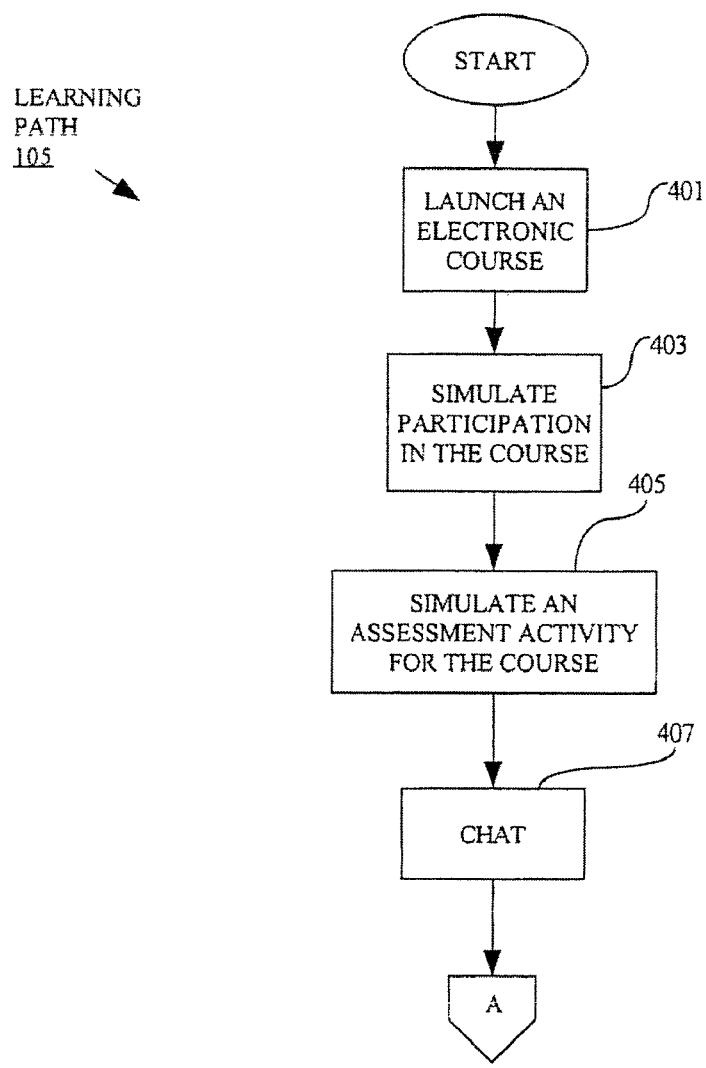
FIG. 4 illustrates an exemplary method for simulating a learning workload for use with the method of FIG. 1.

FIG. 4 illustrates an exemplary method for simulating a learning workload for use with the method of FIG. 1. The process commences at block 401 where an electronic course is launched. Participation in the course is simulated at block 403. An assessment activity, such as a test, is simulated for the course (block 405). A simulated chat about the course is initiated with a randomly selected virtual buddy selected from a virtual buddy list (block 407). The process then returns to FIG. 1 where first, second, third, and fourth weighted probabilities 111, 112, 113, and 114 (FIG. 1) are applied to select another path.

Figure 5:
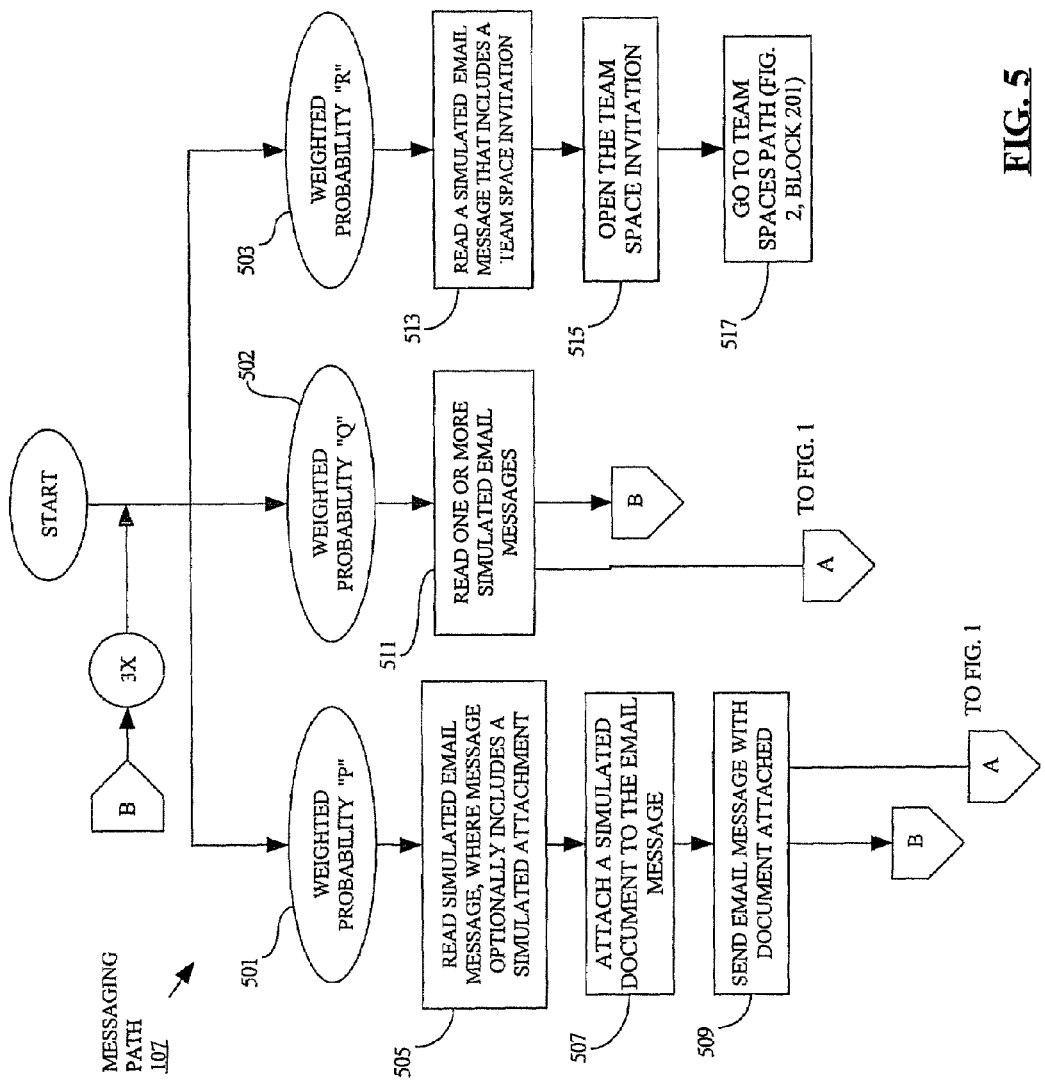
FIG. 5 illustrates an exemplary method for simulating a messaging workload for use with the method of FIG. 1.

FIG. 5 illustrates an exemplary method for simulating a messaging workload for use with the method of FIG. 1. The method commences at blocks 501, 502, or 503 where one of three sub-paths are randomly selected based upon weighted probability P, weighted probability Q, and weighted probability R, wherein these weighed probabilities sum to one (signifying 100%). Upon random selection of a first sub-path, the process advances to block 505 where a simulated email message is read. This simulated email message optionally contains an attachment. Next, a simulated document is attached to the email message (block 507). The email message is then sent with the document attached (block 509). The process then loops back to block 501, 502, or 503 for one or more iterations (three iterations are shown in FIG. 5 for illustrative purposes), after which the process returns to FIG. 1 where first, second, third, and fourth weighted probabilities 111, 112, 113, and 114 (FIG. 1) are applied to select another path.

Upon selection of a second sub-path, the process of FIG. 5 leads to block 511 where one or more simulated email messages are read. The process then loops back to block 501, 502, or 503 for one or more iterations (three iterations are shown in FIG. 5 for illustrative purposes), after which the process returns to FIG. 1 where first, second, third, and fourth weighted probabilities 111, 112, 113, and 114 (FIG. 1) are applied to select another path.

Upon selection of a third sub-path, the process of FIG. 5 leads to block 513 where a simulated email message is read that includes a team space invitation. The team space invitation is opened at block 515. At block 517, the process advances to the team spaces path (FIG. 2, block 201).

Figure 6:
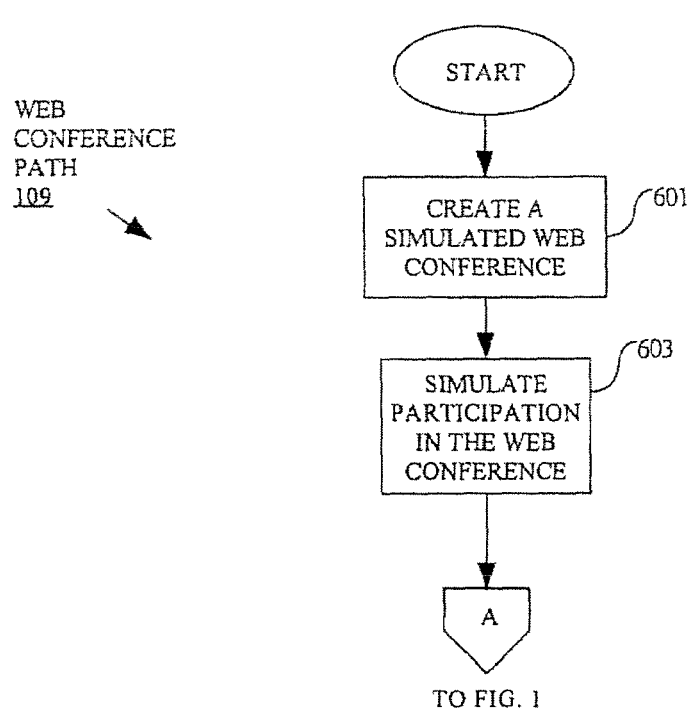
FIG. 6 illustrates an exemplary method for simulating a web conference workload for use with the method of FIG. 1.

FIG. 6 illustrates an exemplary method for simulating a web conference workload for use with the method of FIG. 1. The process commences at block 601 where a simulated web conference is created. Next, participation in the web conference is simulated (block 603). The process then returns to FIG. 1 where first, second, third, and fourth weighted probabilities 111, 112, 113, and 114 (FIG. 1) may, but need not, be applied to select another path.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of generating a simulated collaborative mix workload for assessing performance of enterprise software executed on a hardware platform, the method comprising:
    generating the simulated collaborative mix workload by executing at least two of a team spaces path, a documents path, a learning path, a messaging path, or a web conference path;
    wherein the team spaces path generates a simulated discussion with team members and generates a search query for locating a forum within the team space;
    wherein the documents path generates a library search to locate a document, opens the document, reads the document, and generates a simulated chat about the document;
    wherein the learning path launches a simulated course and a simulated assessment activity;
    wherein the messaging path reads a simulated email, attaches a document to the simulated email, and sends the simulated email with the attached document;
    wherein the web conference path generates a web conference attended by a plurality of simulated users; and
    wherein at least one of the team spaces path, documents path, learning path, or messaging path are performed more than once;
    such that the collaborative mix workload includes a combination of mail, instant messaging, electronic meetings, documents, and electronic learning.

2. The method of claim 1 further including assigning a first randomized probability to the team spaces path, a second randomized probability to the documents path, a third randomized probability to the learning path, and a fourth randomized probability to the messaging path, wherein the first, second, third, and fourth randomized probabilities when summed yield a total of one.

3. The method of claim 2 further including randomly selecting a path for a virtual user from among the team spaces path, documents path, learning path, and messaging path, based upon the first, second, third, and fourth randomized probabilities.

4. The method of claim 3 further including repeating the randomly selected path for a total of two or more iterations.

5. The method of claim 4 wherein, after the randomly selected path is repeated for a total of two or more iterations, another path is randomly selected based upon the first, second, third, and fourth randomized probabilities.

6. A computer program product for generating a simulated collaborative mix workload for assessing performance of enterprise software executed on a hardware platform, tile computer program product comprising a storage medium readable by a processing circuit and storing instructions for execution by the processing circuit for facilitating a method comprising:
    generating the simulated collaborative mix workload by executing at least two of a team spaces path, a documents path, a learning path, a messaging path, or a web conference path;
    wherein the team spaces path generates a simulated discussion with team members and generates a search query for locating a forum within the team space;
    wherein the documents path generates a library search to locate a document, opens the document, reads the document, and generates a simulated chat about the document;
    wherein the learning path launches a simulated course and a simulated assessment activity;
    wherein the messaging path reads a simulated email, attaches a document to the simulated email, and sends the simulated email with the attached document;
    wherein the web conference path generates a web conference attended by a plurality of simulated users; and
    wherein at least one of the team spaces path, documents path, learning path, or messaging path are performed more than once;
    such that the collaborative mix workload includes a combination of mail, instant messaging, electronic meetings, documents, and electronic learning.

7. The computer program product of claim 6 further including instructions for assigning a first randomized probability to the team spaces path, a second randomized probability to the documents path, a third randomized probability to the learning path, and a fourth randomized probability to the messaging path, wherein the first, second, third, and fourth randomized probabilities when summed yield a total of one.

8. The computer program product of claim 7 further including instructions for randomly selecting a path for a virtual user from among the team spaces path, documents path, learning path, and messaging path, based upon the first, second, third, and fourth randomized probabilities.

9. The computer program product of claim 8, further including instructions for repeating the randomly selected path for a total of two or more iterations.

10. The computer program product of claim 9 wherein, after the randomly selected path is repeated for a total of two or more iterations, another path is randomly selected based upon the first, second, third, and fourth randomized probabilities.

* * * * *